United States Patent
Imai

(10) Patent No.: US 9,768,453 B2
(45) Date of Patent: Sep. 19, 2017

(54) FUEL CELL SEPARATOR AND METHOD FOR PRODUCING THE SAME

(71) Applicant: Shimizu-seisakusyo co., ltd., Ichinomiya (JP)

(72) Inventor: Haruo Imai, Ichinomiya (JP)

(73) Assignee: SHIMIZU-SEISAKUSYO CO., LTD., Ichinomiya (JP)

( * ) Notice: Subject to any disclaimer, the term of this patent is extended or adjusted under 35 U.S.C. 154(b) by 0 days.

(21) Appl. No.: 15/304,532

(22) PCT Filed: Nov. 20, 2015

(86) PCT No.: PCT/JP2015/082716
§ 371 (c)(1),
(2) Date: Oct. 17, 2016

(87) PCT Pub. No.: WO2017/085868
PCT Pub. Date: May 26, 2017

(65) Prior Publication Data
US 2017/0237083 A1    Aug. 17, 2017

(51) Int. Cl.
*H01M 8/02* (2016.01)
*H01M 8/026* (2016.01)
*H01M 8/0247* (2016.01)

(52) U.S. Cl.
CPC ......... *H01M 8/026* (2013.01); *H01M 8/0247* (2013.01)

(58) Field of Classification Search
CPC ............. H01M 8/0202; H01M 8/0204; H01M 8/0206; H01M 8/0208; H01M 8/021; H01M 8/0247; H01M 8/0254; H01M 8/0258; H01M 8/0267; H01M 8/2483; H01M 8/026

See application file for complete search history.

(56) References Cited

FOREIGN PATENT DOCUMENTS

| JP | 2002-175818 | 6/2002 |
|---|---|---|
| JP | 2003-249237 | 9/2003 |
| JP | 2003-249241 | 9/2003 |
| JP | 2003-338295 | 11/2003 |
| JP | 2005-166463 | 6/2005 |
| JP | 2008-041456 | 2/2008 |

OTHER PUBLICATIONS

Japanese Office Action for corresponding JP Application No. 2016-503477, dated Apr. 7, 2016.
International Search Report for corresponding International Application No. PCT/JP2015/082716, dated Jan. 19, 2016.
Written Opinion for corresponding International Application No. PCT/JP2015/082716, dated Jan. 19, 2016.

*Primary Examiner* — Carlos Barcena
(74) *Attorney, Agent, or Firm* — Mori & Ward, LLP

(57) ABSTRACT

In a fuel cell separator comprising gas flow channels composed of a plurality of concavoconvex parts in the center region and flat parts on the periphery of the gas flow channels, the fuel cell separator provided with the first bent parts that bend approximately vertically to the same direction respectively at both edge parts at least in one direction among on flat parts in both directions of gas flow channels, and the second bent parts between gas flow channel-side flat parts and edge-side flat parts on the flat parts in the inward from the first bent parts on both sides with a smoothly curved cross-sectional shape of the gas flow channel-side bent ends of the second bent parts, and the production method thereof.

16 Claims, 9 Drawing Sheets

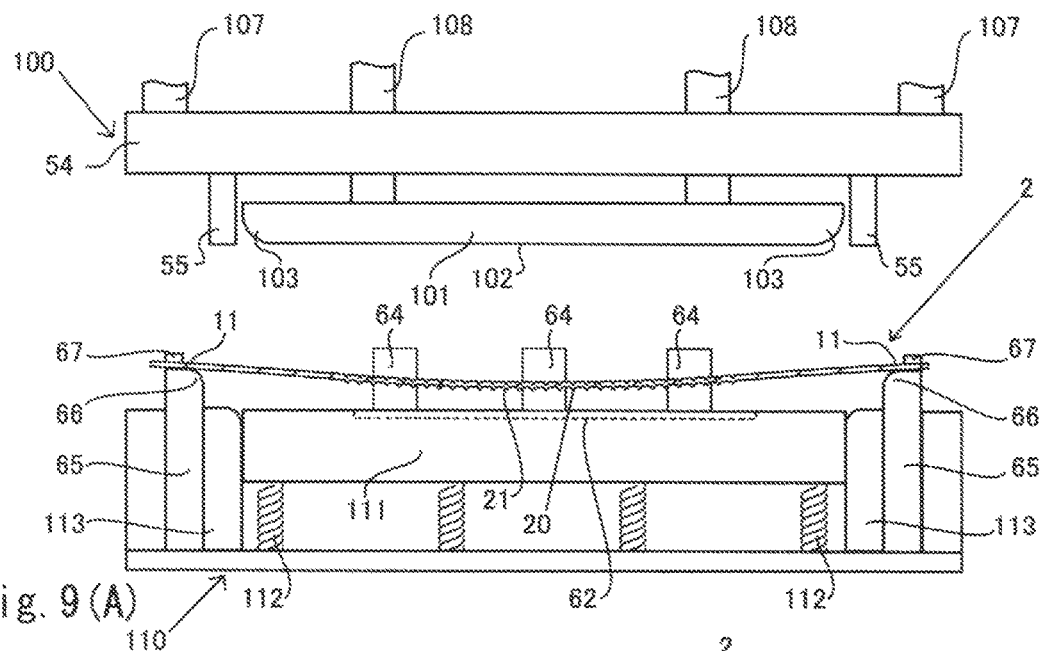
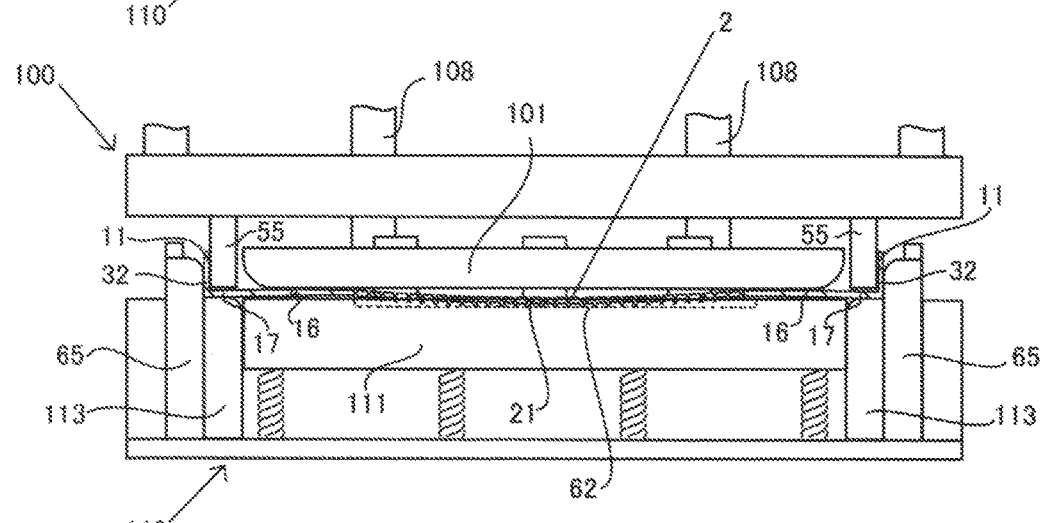
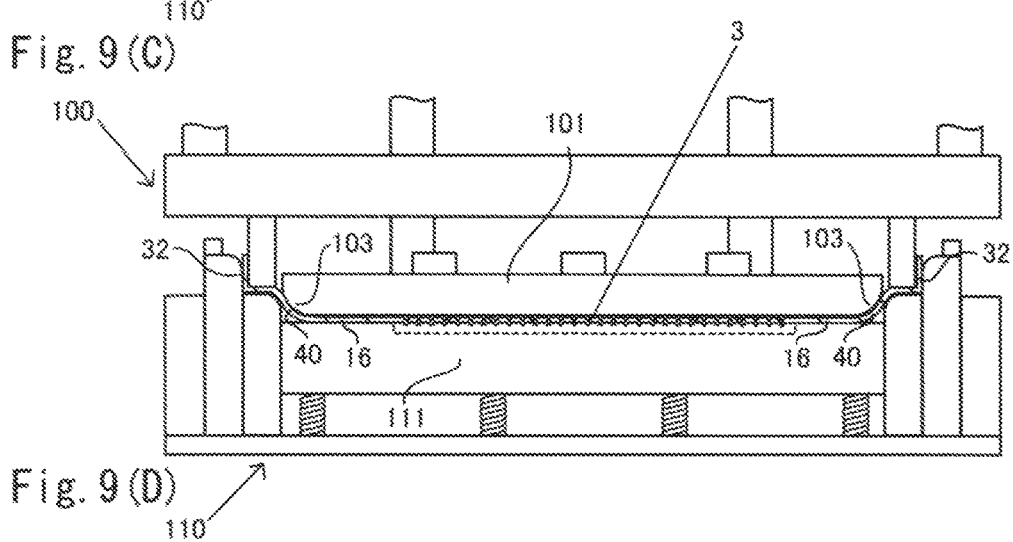
Fig. 9(A)
Fig. 9(C)
Fig. 9(D)

FUEL CELL SEPARATOR AND METHOD FOR PRODUCING THE SAME

TECHNICAL FIELD

The present invention relates to a fuel cell separator and a method for producing the same. More particularly, the present invention relates to a fuel cell separator with a small warp comprising gas flow channels composed of a plurality of concavoconvex parts on a metallic flat plate, and a method for producing the same by press forming.

BACKGROUND ART

In recent years, fuel cells with high efficiency and high environmental performance are being desired. However, fuel cells are not still widespread for high production costs. One of the reasons of high production costs is a high price of a fuel cell separator. In conventional fuel cell separators, since gas flow channels are formed on metallic flat plates by machining or etching process, production time is lengthy and the production unit price for a piece becomes extremely expensive.

Therefore, reduction of production cost of a fuel cell separator is important in order to spread usage of fuel cells. As a result, processing methods of metallic fuel cell separators are moving towards press forming from expensive etching, etc. However, an issue exists in that when a plurality of concavoconvex parts is press-formed on a smooth metallic flat plate, residual stress remains on the concavoconvex parts and the periphery thereof, and a warp occurs on the fuel cell separator.

If a warp occurs on a fuel cell separator, an issue emerges in that the surface pressure between the fuel cell separator and electrodes becomes uneven and the contact resistance becomes high, and reduction of gas sealing performance along with lowering generated voltage takes place. Furthermore, there is also an issue in that since fuel cell stacks need to be assembled while correcting warps, the assembling work becomes complicated.

Also, for fuel cells used in fuel cell vehicles, since smaller and lighter fuel cells are desired, fuel cell separators are produced with thin metallic flat plates of approximately 0.2 mm to 0.3 mm in thickness. However, since thickness of the metallic plate is thin and the stiffness is low, when gas flow channels are press-formed, a warp tends to occur on the fuel cell separator. Then, technologies to reduce a warp even on a fuel cell separator of thin thickness are disclosed in Patent Literature 1 and Patent Literature 2.

In the technology of Patent Literature 1, the technology of a fuel cell separator, composed of formed conductive parts in the center of a metallic flat plate and edge parts on the periphery of the conductive parts, is disclosed. According to the technology of Patent Literature 1, stiffness of the edge parts becomes high by forming ribs with convex parts on one side and grooves on the other side on the edge parts of the conductive parts, thereby a warp of the entire fuel cell separator is suppressed.

However, in the technology of Patent Literature 1, providing the ribs on the edge parts is an essential requirement, since the ribs raise stiffness of the edge parts and a warp of the fuel cell separator is suppressed. As a result, a fuel cell separator with entire edge parts being flat cannot be given. In this case, since passage holes arranged in a manner to penetrate flat parts of the edge parts while overlapping cells for such as fuel flow are constrained in placement, issues emerge such as large surface area of a cell, necessity of providing concavoconvex grooves to match the shapes of the ribs, along with larger thickness of sealing material.

In Patent Literature 2, the technology is disclosed to suppress a warp on a solid polymer type fuel cell separator of less than 0.2 mm thin plate. According to the technology of Patent Literature 2, in a fuel cell separator comprising gas flow channels along the fuel cell separator in the center and flat parts on the periphery thereof, bent parts or concave or convex parts other than the gas flow channels are formed on two sides of the flat parts parallel to the longitudinal direction of the gas flow channels. Meanwhile, portions without the bent parts, etc. are prepared on two sides of the flat parts parallel to the wide direction of the gas flow channels. With this, it is asserted that a warp of the fuel cell separator can be suppressed by increasing stiffness of the flat parts, even if thin plate of less than 0.2 mm, which is difficult to assure stiffness as material for fuel cell separator components, is employed.

However, according to the technology of Patent Literature 2, since a thin plate of less than 0.2 mm in thickness, which is difficult to assure stiffness, is targeted, an issue existed in that partial damage and warps might occur by collisions of the plates while moving the plates in a laminating assembly process. Furthermore, in the case of a thick plate, by judging to assure stiffness enough for a fuel cell separator as material, occurrence of a warp was not projected.

On the other hand, in the case of fuel cells utilized as stationary power generators, which are not necessarily required to be smaller and lighter as in fuel cell vehicles, a fuel cell separator of a thick plate was possible to be used. Here, the thick plate means a metallic plate with at least more than approximately 0.5 mm in thickness.

However, when a thick plate is employed for a fuel cell separator, although the fuel cell separator is not susceptible to deform and is easy to assemble at the time of stacking the fuel cell separators, once the thick plate was warped, conventional suppression methods could not suppress the warp.

The inventor of the present invention made prototypes by using plates of 0.8 mm in thickness considered not susceptible to warp, at the time of press-forming fuel cell separators. However, even if a thick plate is employed for a fuel cell separator, the inventor faced a new issue in that a warp may occur on the fuel cell separator depending on density and arrangement of concavoconvex parts.

In such a case, since stiffness of the plate itself is high in addition to strong residual stress acting on the thick plate in the magnitude to cause a warp, it was extremely difficult to correct the warp. Therefore, the inventor of the present invention challenged to provide a production method of a fuel cell separator to be able to correct a warp, even if the warp occurs on a thick metallic plate when concavoconvex parts are press-formed in high density, and a fuel cell separator with a warp corrected.

In Patent Literature 3, the technology of a production method of a fuel cell separator, in which a warp incurred by press forming on the fuel cell separator can be corrected by applying pressure to and partially compressing flat parts of the periphery of gas flow channels after press-forming the gas flow channels on a metallic thin plate, is disclosed. According to the technology of Patent Literature 3, in the first step, the gas flow channels composed of vertically long concavoconvex shapes are press-formed in the center, leaving the periphery up and down and sideways of the metallic flat plate. And, in the second step, a plurality of compression-formed parts, which are parallel to the longitudinal direction of the gas flow channels and also continuously linear from the ends of the gas flow channels to the peripheral edges of the fuel cell separator, are press-formed contiguously only on the flat parts of the edge parts in the longitudinal direction of the gas flow channels.

Although the compression-formed parts are said to be extremely shallow compressed parts with approximately 1/1000 plate thickness, forming concavoconvex shapes on the peripheral flat parts is unchanged, and issues emerged in that the assembling work was difficult while maintaining airtight and watertight properties of the fuel cell separator, and deterioration of airtight and watertight properties was possible with a lapse of time.

In Patent Literature 4, the technology of a production method of a fuel cell separator, in which a warp incurred by press forming on the fuel cell separator can be corrected by applying tensional force on the periphery of gas flow channels after the gas flow channels are press-formed on a metallic thin plate, is disclosed. According to the technology of Patent Literature 4, in the first step, the gas flow channels of vertically long concavoconvex shapes are press-formed in the center, leaving the periphery up and down and sideways on the metallic flat plate. And, in the second step, while the periphery parallel to the longitudinal direction of the above gas flow channels is fixed firmly, tensional force is applied only to the periphery orthogonal to the longitudinal direction of the gas flow channels to correct a warp of the fuel cell separator.

Specifically, flat parts on both sides of the gas flow channels on the fuel cell separator are bent downwards to create hooking pieces, the periphery of the gas flow channels is fixed firmly by pinching from top and bottom with jigs, cam dies engage onto the hooking pieces on both sides of the gas flow channels, and the both sides of the gas flow channels are spread by opening the cum dies sideways. Therefore, fixing mechanism to vertically pinch the fuel cell separator, and cum die mechanism to spread horizontally the both sides of the fuel cell separator are required.

Then, in the technology of Patent Literature 4, issues existed in that since equipping the above cum die mechanism to a press machine was necessary, the press mechanism became complex and spreading only the above both sides by using a conventional press machine was difficult. Therefore, the inventor of the present invention made trial to correct a warp of a thick plate with a warp occurred only by using a press mechanism of a conventional press machine. In the course of the trial, for a thick plate, only the both sides elongated, and correcting a warp on concavoconvex parts could not be achieved by spreading only the above both sides.

CITATION LIST

Patent Literature

Patent Literature 1: Japanese Unexamined Patent Application No. 2002-175818
Patent Literature 2: Japanese Unexamined Patent Application No. 2003-338295
Patent Literature 3: Japanese Unexamined Patent Application No. 2003-249237
Patent Literature 4: Japanese Unexamined Patent Application No. 2003-249241

DISCLOSURE OF INVENTION

Problem to be Solved by the Invention

Issues to be solved by the present invention relate to a method for producing a fuel cell separator so that a warp does not occur even on a fuel cell separator with a plurality of concavoconvex parts being press-formed on a thick metallic plate, and also relate to providing a fuel cell separator with a small warp.

Means for Solving Problem

The first invention according to the present invention is characterized as follows: in a method for producing a fuel cell separator composed of a metallic flat plate and comprising gas flow channels composed of a plurality of concavoconvex parts in the center region and flat parts on the periphery of the above gas flow channels, the step to form the above gas flow channels and the first step, which bends approximately vertically to the same direction and fixes each of both edge parts at least in one direction on the above flat parts, are included; the second step, which, on each of the flat parts between bent lines of the both edge parts bent in the first step and the center region, bends parallelly to the above bent lines by relatively moving flat parts in the vicinity of the above center region and flat parts in the vicinity of the above bent lines to the vertical direction against the metallic flat plate, is also included; the second step is carried out after the formation step of the gas flow channels, and while the flat parts in the vicinity of the above bent lines are inhibited to be drawn to the above center region in the second step, tensile force is applied to the flat parts in the vicinity of the above center region, thereby a warp on the metallic flat plate is suppressed.

Size, shape, and thickness of the metallic flat plate are not limited. A warp can be suppressed even on a thick metallic plate of 0.5 mm to 1 mm in thickness, but certainly possible on a plate of less thickness than that. Material of the fuel cell separator is not restricted, as long as Ferritic stainless steel or Ni—Cr-based alloy, etc., with a thermal expansion coefficient thereof approximate to electrolyte film is used. Shapes, size, number, and spacing, etc. of the concavoconvex parts comprising the gas flow channels are not restricted. On the flat parts surrounding the gas flow channels, the production method of the present invention can be applied at least to one direction of two crossing directions along the surface, applied to the both directions successively, or applied to the both directions at the same time.

In the first step, both edge parts at least in one direction among on the flat parts in both directions of the periphery of the center region comprising the gas flow channels are in a state of being bent. By bending the both edge parts, the bent both edge parts are caught by a die. Since the both edge parts are in a state of being hooked to the press die, the both edge parts are not to be drawn along the surface.

Therefore, in the second step, on the flat parts in the inward of the bent lines bent in the first step, even if tension force is applied on the flat parts in the vicinity of the center region by relatively moving and bending the flat parts in the vicinity of the center region and the flat parts in the vicinity of the above bent lines to the vertical direction to the metallic flat plate, the flat parts in the vicinity of the bent lines are not to be drawn to the inward side. That is, since the both edge parts are in a state of being hooked by the die and the flat parts in the vicinity of the bent lines are not to be drawn to the center region side, the tension force acts uniformly to the flat parts in the vicinity of the center region and the inward. In the second step, bending parallelly to the direction bent in the first step is appropriate, but not restricted, and the bending location can be determined depending on arrangement of the gas flow channels, etc.

Here, the distance of the relative movement is determined depending on a level of a warp. Specifically, in the case of a small warp, the distance of the relative movement between the flat parts in the vicinity of the center region and the flat parts in the vicinity of the bent lines becomes small, on the other hand in the case of a large warp, the distance of the relative movement between the flat parts in the vicinity of the center region and the flat parts in the vicinity of the bent lines is better to be set large so as to apply the tensional force strongly.

By the both edge parts being fixed, even for a thick plate, a warp of which is difficult to be corrected by conventional technology, the tensile force acts entirely on the flat parts in the vicinity of the center region, and a warp is corrected or occurrence of a warp is suppressed so as not to deform shapes of the concavoconvex parts distortedly. Here, variations of the relative movement are not limited and can be to move the both bent edge parts and the flat parts in the vicinity of the bent lines in one-piece unit while the flat parts in the vicinity of the center region are fixed, to move only the flat parts in the vicinity of the center region while the both bent edge parts and the flat parts in the vicinity of the bent lines are fixed in one-piece unit, or to move altogether.

Also, since the tensile force acts on the entire region of the flat parts in the vicinity of the center region, no biased residual stress remains, therefore a warp on the gas flow channel-side flat parts is not to come back, even if the both bent edge parts, etc. are cut and removed after the warp is corrected. Then, favorable effect is given in that the fuel cell separator in a flat condition are easy to be obtained even without concavoconvex shapes, etc. on the periphery.

By the second step, in which the center part and the periphery are relatively moved against the surface of the metallic flat plate, compression force by pressurizing operation is changed to horizontal tensile force along the metallic flat plate. That is, since either bending of the both edge parts in the first step or bending in the second step can be carried out by pressurizing operation of a conventional press machine, a warp of the fuel cell separator can be corrected or suppressed by a conventional press machine.

With this effect, a fuel cell separator with a small warp can be produced by using a existing press machine only by altering press dies, with no necessity of any alteration or addition of complex mechanisms to a conventional press machine, and with no necessity of attaching pulling devices, etc., then the production space for the fuel cell separator is not necessary to be wider than that of a conventional press machine.

In addition, regardless of thickness of a metallic flat plate, even in the case a plurality of concavoconvex parts is press-formed, a fuel cell separator with a small warp and also in a flat condition without any concavoconvex parts on the entire periphery can be gained. With this, regardless of thickness of a metallic flat plate, a fuel cell separator with high gas tight performance can be produced easily.

The second invention according to the present invention is the production method of the fuel cell separator of the first invention, and is characterized in that the first step and the second step are included after the gas flow channel forming step to configure the above gas flow channels. The first step and the second step can be either sequential steps or multiple steps. Since the step to configure the gas flow channels and the step to correct a warp are separated, pressurizing can be done by a press machine to suit the each individual step, and use of a large press machine with high pressurizing capacity is not necessary.

The third invention according to the present invention is the production method of the fuel cell separator of the first invention, and is characterized in that the gas flow channel forming step to configure the above gas flow channels is included between the first step and the second step. Firstly, since the gas flow channels are formed while the both edge parts are in a state of being bent, the both edge parts are hard to be drawn, and occurrence of a warp is suppressed when the gas flow channels are press-formed. In the second step, since only a small warp needs to be corrected, pressurizing force necessary for the second step can be small. Then, the fuel cell separator with high quality and high dimensional accuracy of concavoconvex parts can be produced.

The forth invention according to the present invention is the production method of the fuel cell separator of the first invention, and is characterized in that the gas flow channel forming step to configure the above gas flow channels and the second step are carried out at the same time after the first step. The gas flow channel forming step, in which a warp tends to occur, and the second step to suppress a warp are carried out at the same time, thereby at a point in time when the gas flow channels are press-formed, the fuel cell separator is already in a state of no warp. By carrying out the gas flow channel forming step and the second step at the same time, producing the fuel cell separator with high quality and high dimensional accuracy of concavoconvex parts in high production efficiency becomes possible.

A fuel cell separator of the fifth invention according to the present invention is characterized as follows: in the fuel cell separator with a small warp composed of a metallic flat plate and comprising gas flow channels composed of a plurality of concavoconvex parts in the center region and flat parts in the periphery of the above gas channels, the first bent parts bending approximately vertically to the same direction respectively on both edge parts at least in one direction of the above flat parts are provided; the second bent parts are also provided between the above gas flow channels and each of the bent lines configured by the first bent parts; the sectional shape of the gas flow channel-side bending ends in each of the second bent parts is smoothly curved; and in the flat parts in the inward of each of the above bent ends, by elongating to the orthogonal direction to the above bent lines, the thickness of the flat parts located on the both sides of the above gas flow channels is made thinner than the thickness of the first bent parts, and residual stress is reduced.

On the flat parts in the inward of the bent lines on both sides, the respective second bent parts are bent. It is suitable but not limited that the second bent parts are bent parallelly to each of the bent lines, and the bending location can be determined depending on arrangement of the gas flow channels, etc. Moreover, the first bent parts and the second bent parts are not limited to be bent either to the surface side or to the reverse side of the metallic flat plate. Since the first bent parts are bent approximately vertically when the second bent parts are bent, the first bent parts are not to be drawn to the inward side. Also, even if the second bent parts are formed after the first bent parts are formed, since the sectional shape of the gas flow channel-side bent end of the second bent parts is smoothly curved, the metallic flat plate itself does not break, necking does not occur, and shapes of concavoconvex parts of the gas flow channels are not distortedly deformed.

The smooth curve of the cross sectional shape of the bent end is realized for example by making a shoulder edge part of a press die in a curve with a curvature more than three times thickness of the metal plate, or in a curve along a part of a circle with 2 mm to 5 mm radius or a oval shape, but not restricted. By bending smoothly along the outer surface of the shoulder edge part of the press die, the metallic flat plate can be elongated without breakage or necking on the metallic flat plate.

The bent shape of the second bent parts is appropriately adjusted depending on a warp level of the fuel cell separator. In the case a warp of the fuel cell separator is small, it is good to bend shallowly by making the relative movement small so that the bent ends are gently bent, and in the case of a large warp, it is good to bend deeply by making the relative movement large. With this, the fuel cell separator with a small warp can be produced even with a thick plate.

The sixth invention according to the present invention is the fuel cell separator of the fifth invention, and is characterized in that thickness of the above metallic plate is more than 0.5 mm and less than 1.0 mm. Since the metallic flat plate is a thick plate of more than 0.5 mm in thickness and the stiffness is high, then even if outward portion from the second bent parts is cut and removed, the smooth metallic flat plate is hard to deform, thereby the fuel cell separator that is easy to assemble cells is gained. Moreover, since the thick plate is less than 1.0 mm in thickness, the fuel cell separator can be produced without employing a press machine with high pressurizing capacity.

The seventh invention according to the present invention is the fuel cell separator of the fifth or the sixth invention, and is characterized in that the above concavoconvex parts contain a plurality of linear ribs extending long to one direction. The ribs need not to be continuous, can be divided, or can be mixed with dotted concavoconvex parts. Undulations or shapes of the ribs are not limited. Accordingly, the fuel cell separator with a small warp becomes the fuel cell separator containing a plurality of linear ribs along the gas flow channels.

The eighth invention according to the present invention is the fuel cell separator of the fifth or the sixth invention, and is characterized in that the above concavoconvex parts are a plurality of independent dotted concavoconvex parts. Here, "dotted" means independent projections without directional properties and the shapes are not restricted. Accordingly, the fuel cell separator with a small warp becomes the fuel cell separator that has no directional properties on the top of the convex parts.

The ninth invention according to the present invention is the fuel cell separator of from the fifth to the eighth invention, and is characterized in that the above metallic flat plate is cut off at four corners, the inward of notch shape of the notch part on each of the four corners is arc-shaped, and the second bent parts are located closer to the edge parts than the above notch parts.

Since the inward of notch shape of the notch parts on the four corners is arc-shaped, when a warp is being corrected, stress incurred by tensile force is inhibited to concentrate on the corners, and when the tensile force is applied even in two directions, the notched portions of the fuel cell separator do not break. Accordingly, even the fuel cell separator with the gas flow channels with a shape, with which a warp tends to occur, becomes the fuel cell separator having a small warp on flat parts and no breakage on the metallic flat plate.

Effect of the Invention

According to the first invention of the present invention, a favorable effect is realized in that with no necessity of adding complex mechanism or alterations to a conventional press machine, a fuel cell separator with a small warp can be produced by a conventional press machine only by altering press dies, and production space of the fuel cell separator does not become wider than that of a conventional press machine with no necessity of adding pulling devices, etc., thereby regardless of thickness of a metallic flat plate, the fuel cell separator with high gas tight performance is easily produced.

According to the second invention of the present invention, since the step to form the gas flow channels and the step to correct a warp are divided, pressurization can be done by a press machine with suitable pressurizing capacity corresponding to each step, thereby a large press machine with high pressurizing capacity need not be used.

According to the third invention of the present invention, the fuel cell separator with high quality and high dimensional accuracy of the concavoconvex parts can be produced.

According to the forth invention of the present invention, the gas flow channel forming step and the second step are carried out at the same time, thereby producing the fuel cell separator with high quality and high dimensional accuracy of the concavoconvex parts in high production efficiency becomes possible.

According to the fifth invention of the present invention, even a thick plate can make a fuel cell separator with a small warp.

According to the sixth invention of the present invention, because of high rigidity, even if the outward portion of the second bent parts is cut and removed, the flat metallic plate is hard to deform, thereby the fuel cell separator, which is easy to assemble cells, is gained. Also, the fuel cell separator can be produced by not using a large press machine with high pressurizing capacity.

According to the seventh invention of the present invention, the fuel cell separator with a small warp becomes the fuel cell separator containing a plurality of linear ribs along the gas flow channels.

According to the eighth invention of the present invention, the fuel cell separator with a small warp becomes the fuel cell separator that has no directional properties on the top of convex parts.

According to the ninth invention of the present invention, even the fuel cell separator with the gas flow channels of a shape, with which a warp tends to occur, becomes the fuel cell separator having a small warp on flat parts and no breakage on a metallic flat plate.

BRIEF DESCRIPTION OF DRAWINGS

FIGS. 9(A), 9(C), and 9(D) are a process drawing for warp correction (Example 4)

BEST MODE(S) FOR CARRYING OUT THE INVENTION

Both edge parts are not to be drawn to the gas flow channel side by bending the both edge parts in one direction of concavoconvex parts comprising the gas flow channels. And, the gas flow channel-side flat parts, i.e. the flat parts in the vicinity of the center part region, and the edge-side flat parts, i.e. the flat parts in the vicinity of the bent line, are bent by relatively moving to the vertical direction to the surface of the fuel cell separator, and since the edge-side flat parts is inhibited to be drawn to the gas flow channel side, tensile force is to be applied to the above gas flow channel-side flat parts, thereby a warp of the fuel cell separator is to be suppressed.

Example 1

Figure 1A:
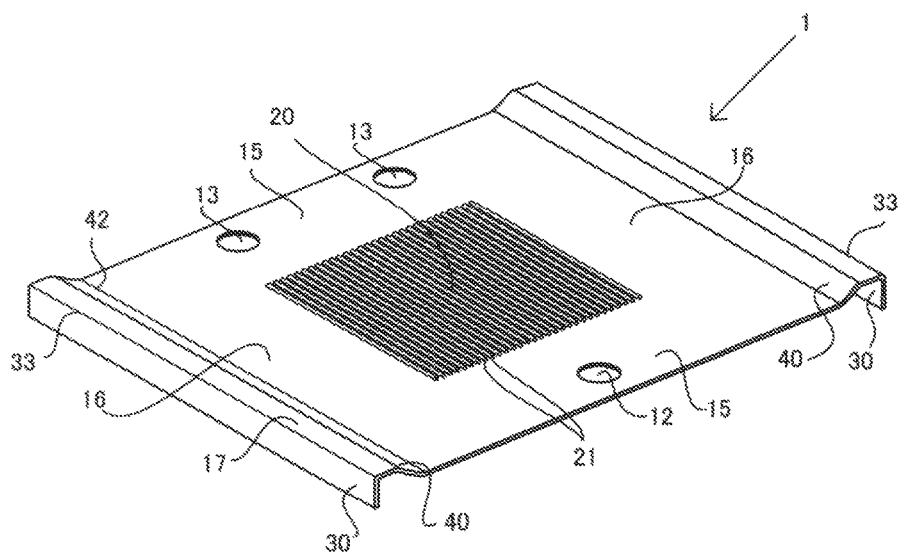
FIGS. 1(A) and 1(B) are a perspective view of a fuel cell separator (Example 1)
Figure 1B:
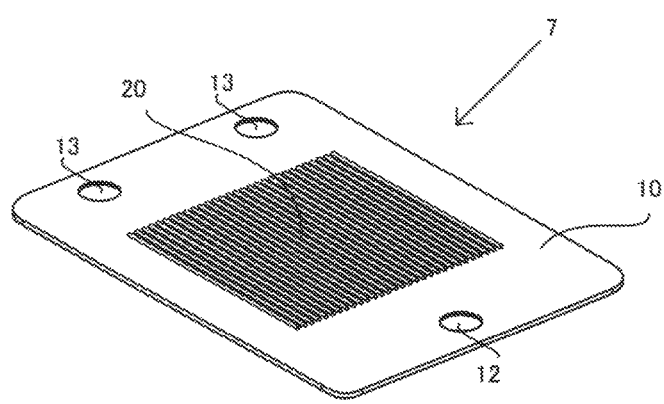
Figure 2A:
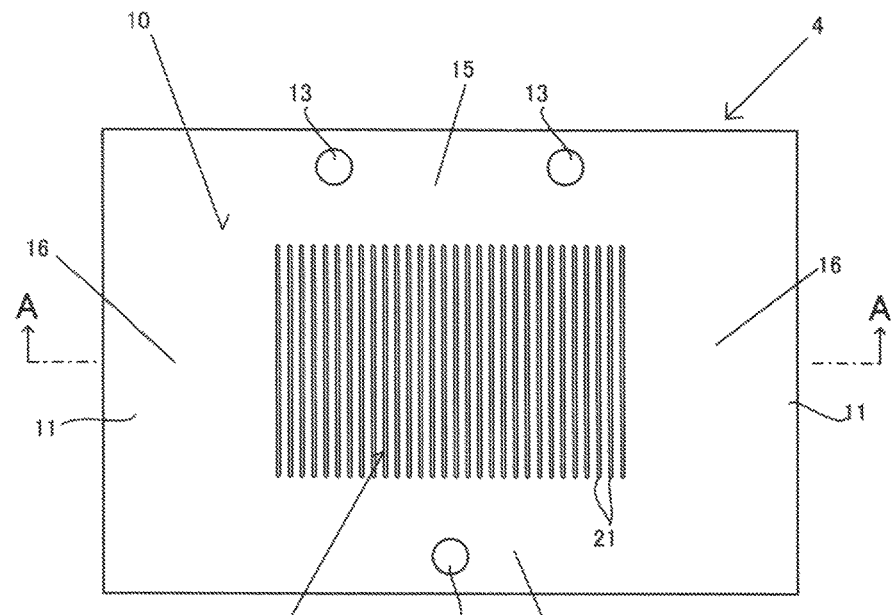
FIGS. 2(A), 2(B), and 2(C) are a thick metallic plate with press-formed gas flow channels (Example 1)
Figure 2B:
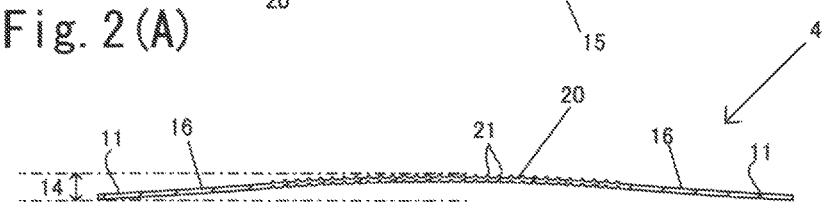
Figure 2C:
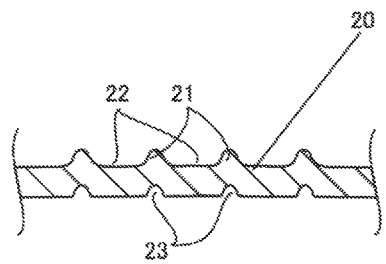

In example 1, a fuel cell separator 1 with a small warp, and the production method thereof will be explained referring to FIGS. 1(A) and 1(B) to FIGS. 4(C), 4(D), and 4(E). FIGS. 1(A) and 1(B) shows a perspective view of the fuel cell separator 1 with a small warp. FIG. 1(A) shows the fuel cell separator 1 after a warp is corrected, and FIG. 1(B) shows a fuel cell separator 7 that is cut out to a desired shape after a warp is corrected. FIGS. 2(A), 2(B), and 2(C) are an explanatory drawing that depicts a fuel cell separator 4 with press-formed gas flow channels. FIG. 2(A) is a plan view of the fuel cell separator 4, FIG. 2(B) is a cross-sectional view taken from line A-A of FIG. 2(A), and FIG. 2(C) is a partially magnified view of FIG. 2(B). FIGS. 3(A) and 3(B) and FIGS. 4(C), 4(D), and 4(E) show step drawings to explain steps to correct a warp.

Firstly, referring to FIGS. 2(A), 2(B), and 2(C), the fuel cell separator 4 before warp correction will be explained. The fuel cell separator 4 before warp correction is composed of a metallic flat plate, provided with a plurality of lineally extending convex parts 21 parallelly in the center region 20, and the periphery is flat part 10. The metallic flat plate is a thick plate of 0.8 mm in thickness. Material of the metallic flat plate is well-known Ferritic stainless steel. On flat parts 15 in the side of the center part region configuring convex parts 21, a piercing hole 12 is provided on one side and two piercing holes 13, 13 on the other side of the convex parts 21 are provided. Each of the piercing holes 12, 13 is for a purpose to locate the metallic flat plate at the step of warp correction.

The linear convex parts 21 are press-formed and defined as convex parts 21 are on the surface side and concave parts on the reverse side (refer to FIG. 2(C)). Gas flow channels 22 for the flow of fuel gas, etc. are formed by spaces between the adjacent convex parts 21, 21 on the surface side. When the linear convex parts 21 are press-formed so as to be pushed out, the center part region 20 of the metallic flat plate elongates, but since the flat parts 10 (refer to FIG. 2(A)) of the periphery thereof do not elongate, a warp 14 occurs so that the center part region 20 of the fuel cell separator 4 bulges out to one side, mainly to the aligned direction of the convex parts 21 (refer to FIG. 2(B)).

Next, referring to FIGS. 1(A) and 1(B), the explanation will be made on the fuel cell separator 1 with a small warp. The fuel cell separator 1 with a small warp is, on the flat part 10 (16) (refer to FIGS. 2(A), 2(B), and 2(C)) of the fuel cell separator 4 before correction, provided with the first bent parts 30 and the second bent parts 40 (FIG. 1(A)). Each of the first bent parts 30 are formed by bending approximately vertically both edge parts 11, 11 (refer FIG. 2(A)) on the side of the extending direction of the convex parts 21, on the flat part 10 of the periphery of the center part region.

The second bent part 40 is formed by bending down gently flat parts 17 located between the first bent parts 30 and the center part region 20 against the surface of the fuel cell separator and parallelly to the bent lines 33. Here, although the location of the second bent part 40 is in the vicinity of the first bent parts in example 1, anywhere between the first bent parts 30 and the center part region 20 can be bent.

Forming the second bent parts 40 on the flat parts in the inward from the bent lines 33 applies outward tensile force orthogonally to the extending direction of the convex parts 21 to the flat part 10 (refer to FIG. 2(A)) on the periphery of the gas flow channels. Application of the tensile force elongates the flat parts 15 on the side of the center part region to the orthogonal direction to the extending direction of the convex parts 21. With this, residual stress occurring between the center part region 20 and the periphery thereof to warp the metallic flat plate is eliminated, thereby a warp occurred on the fuel cell separator 4 before correction is corrected, and the fuel cell separator 1 with a small warp is achieved (FIG. 1(A)).

Furthermore, since the residual stress to warp the metallic flat plate is eliminated, a warp will not reemerge even if the first bent parts 30 and the second bent parts 40 are cut off (FIG. 1(B)). Therefore, by cutting the fuel cell separator 1 to a desired shape, the fuel cell separator 7 with a small warp as well as with no concavoconvex on the flat part 10 can be gained. With this, assembling work becomes easier at the time of assembling fuel cells. Furthermore, since the flat part 10 of the periphery is elongated prior to the center part 20 while the entire both edge parts are fixed, elongation of the flat part 20 is minimized to a degree that the configuration of the gas flow channels 22 is not influenced.

Figure 3A:
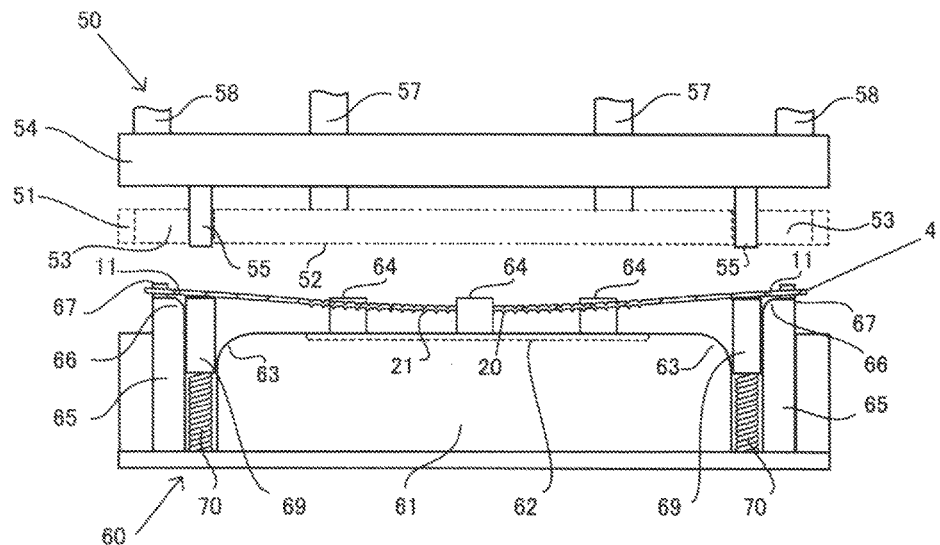
FIGS. 3(A) and 3(B) are a process drawing for warp correction (Example 1)
Figure 3B:
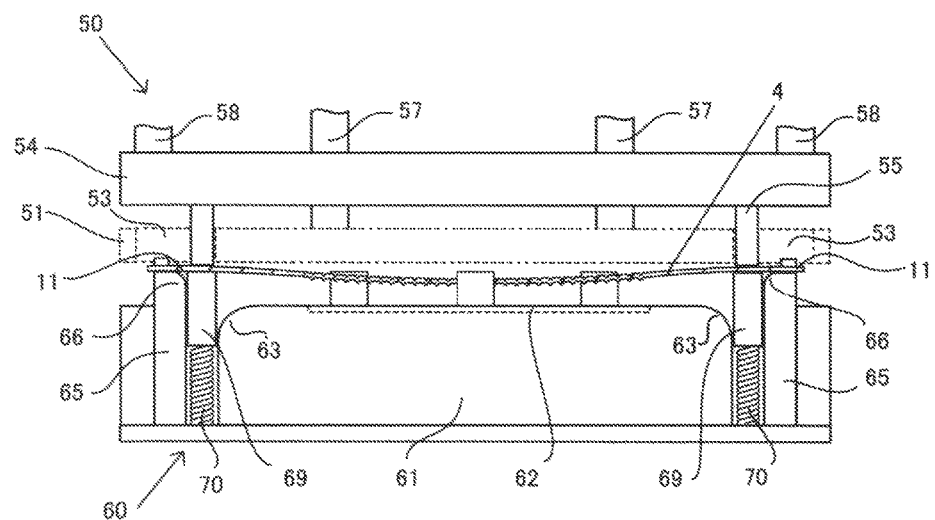
Figure 4C:
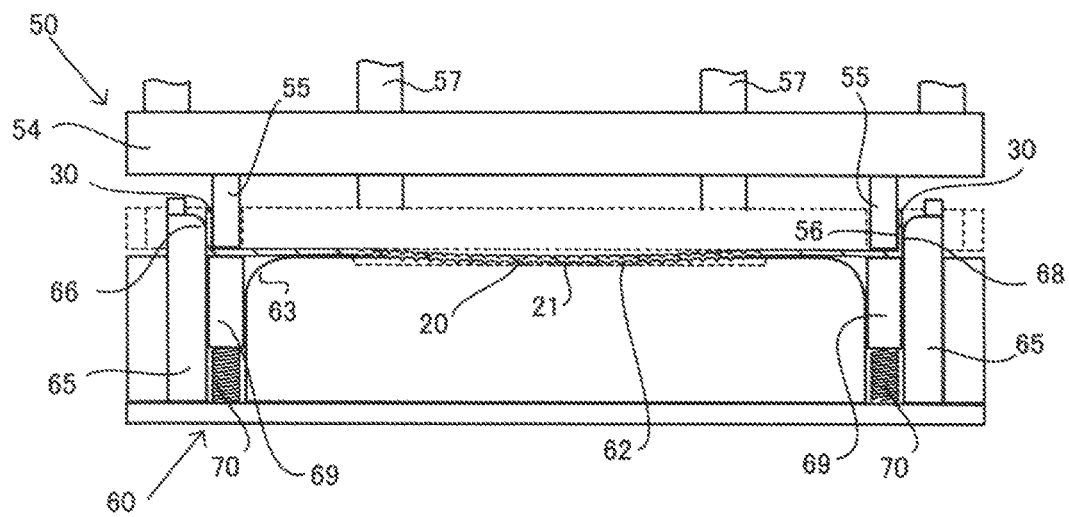
FIGS. 4(C), 4(D), and 4(E) are a process drawing for warp correction (Example 1)
Figure 4D:
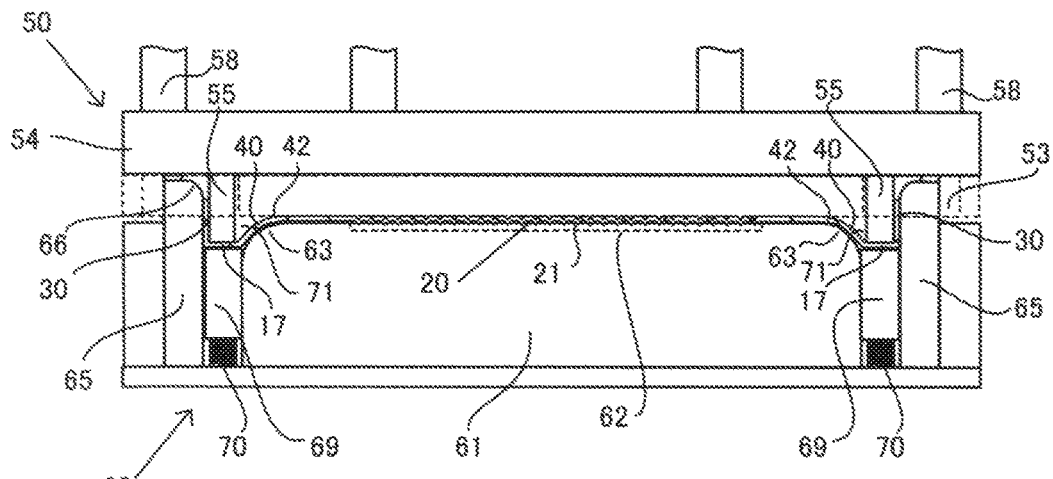
Figure 4E:
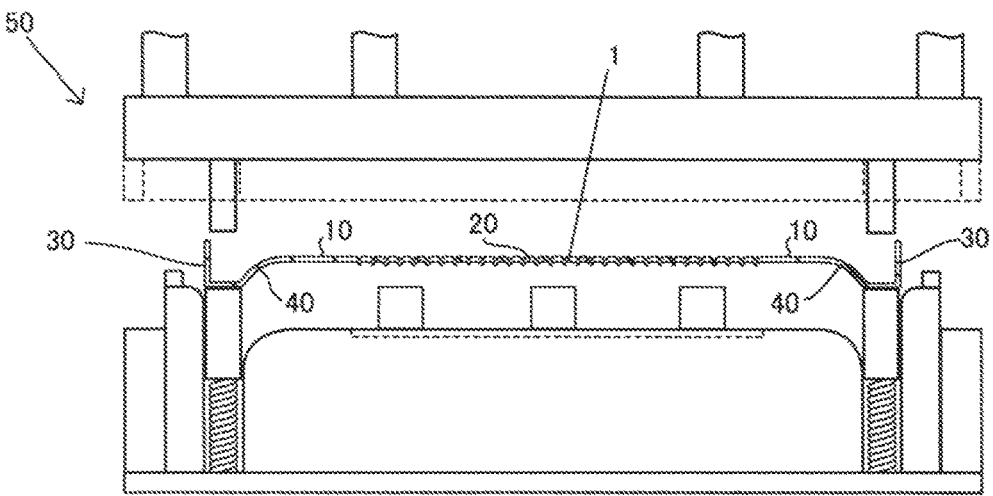

Next, the step of warp correction will be explained referring to FIGS. 3(A) and 3(B) and FIGS. 4(C), 4(D), and 4(E). FIG. 3(A) shows the state before a start of the correction step, and FIG. 3(B) shows the step to pinch and hold the fuel cell separator 4 between upper dies 50 and lower dies 60. FIG. 4(C) shows the step to bend the both edge parts of the fuel cell separator 4, FIG. 4(D) shows the step to bend each of the both inward peripheries of the center part region 20 of the fuel cell separator in a manner to be inclined, and FIG. 4(E) shows the state of the correction step completion. Also, in each figure, in order to make understanding easier, only die portions of a press machine are shown, and some dies are shown in dotted lines.

Firstly, the structure of the press machine will be explained referring to FIG. 3(A). The press machine is consisted of the upper dies 50 and the lower dies 60 to hold and correct the fuel cell separator 4, and well-known press mechanism (illustrations are omitted). The upper dies 50 consist of a prior die 51 (shown in dotted lines in FIGS. 3(A) and 3(B) and FIGS. 4(C), 4(D), and 4(E) for easier understanding) lowering down first, and a posterior die 54 lowering down later, and the both dies are able to move to vertical direction inter-connectedly in one-piece unit by extending extension rods 57. Furthermore, advancing or retreating of moving rods 58 does not move the prior die 51, but enables only the posterior die 54 to move.

The prior die 51 is flat on the lower surface 52, and provided with lineally extending through holes 53 on the both edge parts. The posterior die 54 is provided with penetrating parts 55 extending lineally on the both edge parts. The penetrating parts 55 are inserted through the through holes 53, protrude slightly forward below the lower end of the through holes 53 in the state that the moving rods 58 retreat, and come into contact with the fuel cell separator 4 earlier than the lower surface 52 of the prior die 51. The width of the penetrating parts 55 is thinner than below-mentioned receiving parts 69 by an amount corresponding to the thickness of the fuel cell separator 4. Also, the through holes 53 are in such a width that the both edge parts 11 do not touch the prior die 51 at the time of being bent.

The lower die 60 is provided with a pair of erected parts 65, a pair of the receiving parts 69, and a receiving mount 61. The erected parts 65 extend lineally, and the shoulder parts 66 in the inward thereof are in curved surface. Guide pieces 67 are provided on the upper end surface of the erected parts 65 to locate the fuel cell separator 4 so as not to be shifted to the depth direction. The receiving parts 69 extend lineally, are placed between the erected parts 65 and the receiving mount 61, and are able to move up and downward by extending or shrinking of elastic parts 70. The height of the upper end surface of the receiving parts 69 in the state before being pushed in is aligned to be the same as the height of the upper end surface of the erected parts 65.

The receiving mount 61 is provided with a sunken part 62 in the center so that the convex parts 21 of the fuel cell separator will not be crushed, and flat on the periphery, and the surface of the shoulder parts 63 located adjacent to the receiving parts 69 is curved with the cross sectional shape of an arc of 5 mm radius. And, on the upper surface of the receiving mount 61, locating parts 64, which are inserted to the piercing holes 12, 13 (refer to FIG. 2(A)) provided on the flat part 10 of the fuel cell separator and slightly thinner than the holes 12, 13 to locate the fuel cell separator, are provided.

Next, referring to each drawing of FIG. 3 and FIG. 4, the step of warp correction will be explained. Firstly, the piercing holes 13 of the fuel cell separator 4 before correction are inserted to the locating parts 64, and the fuel cell separator 4, the edges of which come into contact with the guide pieces 67 and are located, is mounted so as to be spanned across between a pair of the erected parts 65, 65 (FIG. 3(A)).

And, the upper die 50 lowers down as the extension rods 57 extend, then the fuel cell separator 4 before correction is pinched between the lower end surface of the penetrating parts 55 and the upper end surface of the receiving parts 69 (FIG. 3(B)). When the extension rods 57 are further extended, in association with advance of the penetrating parts 55, the elastic parts 70 shrink and the receiving parts 69 are pushed down so as to retreat, and the both edge parts 11, 11 of the fuel cell separator 4 before correction are bent approximately vertically along the curved surface of the shoulder parts 66 of the erected parts 65. Then, when the upper end surface of the receiving parts 69 retreats until the position of the same height as the upper surface of the receiving mount 61, the first bent parts 30 are formed (FIG. 4(C)).

And, the first bent parts 30 are inserted into the through holes of the prior die 51 together with the upper portion of the erected parts 65, and are fixed in position by being pinched between the side surface 68 of the erected parts 65 and the side surface 56 of the penetrating parts 55. In this state, in the center part region 20 of the fuel cell separator 4 before correction, the convex parts 21 fall in place of the sunken part 62, thereby crush thereof is prevented.

Next, as the moving rods 58 advance, only the posterior die 54 lowers down and the penetrating parts 55 further advance. Then, the receiving parts 69 are pushed down as the elastic parts 70 shrink further, and hollow grooves 71 are formed between the receiving mount 61 and the erected parts 65. The first bent parts 30 and the flat parts 17 in the vicinity of the bent line configured by the first bent parts are pushed down in one-piece unit so as to be dropped down into the hollow grooves 71. With this, the gas flow channel-side flat parts and the edge-side flat parts are relatively moved to the vertical direction to the surface of the metallic flat plate. Then, the flat parts 17 in the vicinity of the bent line are pulled outward, also bent along the shoulder parts 63 of the receiving mount so that the shape of the cross section of bent ends 42 becomes smooth curve, and the second bent parts 40 are formed (FIG. 4(D)).

At this time, the first bent parts 30 are fixed in position, and will not be drawn to the inward side. Therefore, the tensile force acting while the second bent parts 40 are formed applies to the flat part 10 in the inward from the second bent parts 40. Then, remaining residual stress to incur a warp on the periphery of the center part region 20 vanishes, and the fuel cell separator is corrected to a flat state. Then, the posterior die 54 retreats, and the fuel cell separator without a warp is gained (FIG. 4(E)).

Example 2

Figure 5A:
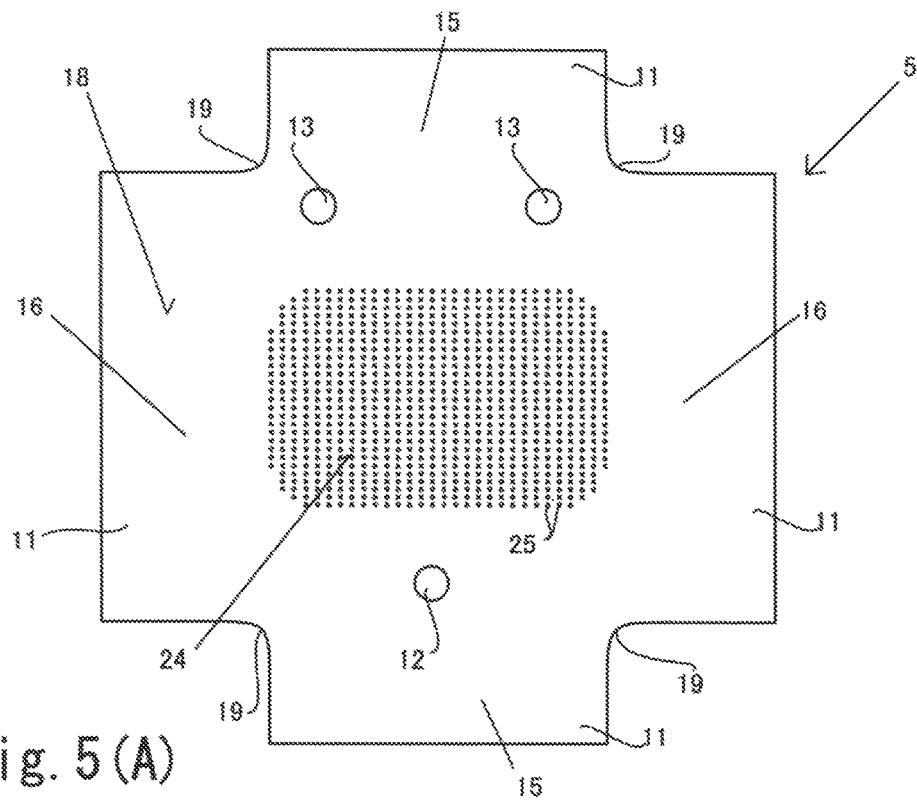
FIGS. 5(A) and 5(B) are a plan view of a fuel cell separator (Example 2)
Figure 5B:
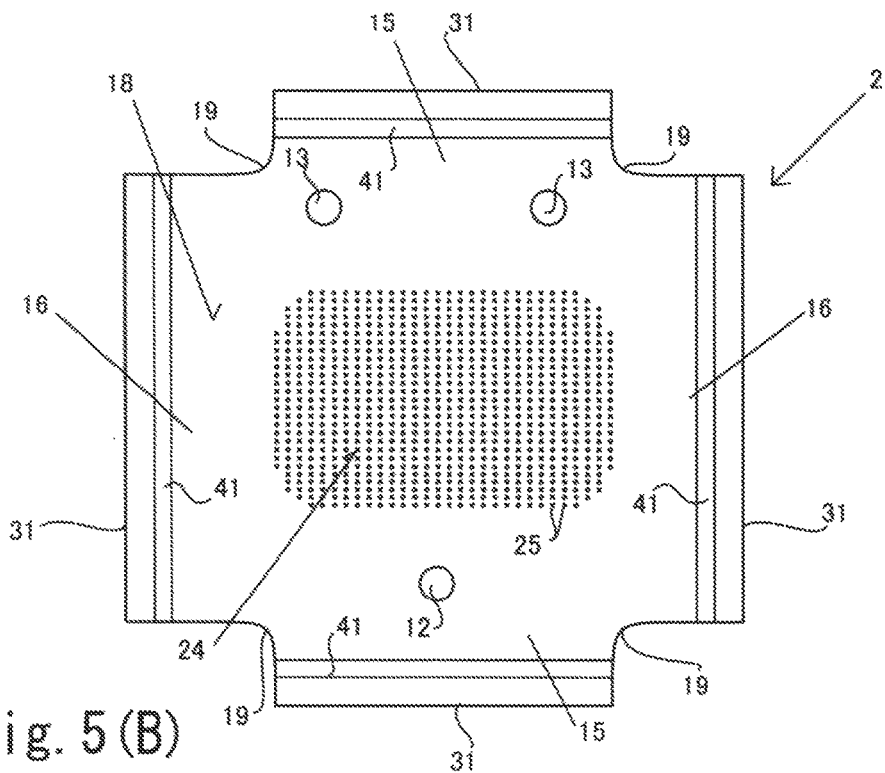

In example 2, referring to FIGS. 5(A) and 5(B), a fuel cell separator 2 in the case to be provided with a plurality of projections in a shape of a matrix will be explained. FIG. 5(A) shows a plan view of a fuel cell separator 5 before correction, FIG. 5(B) shows a plan view of the fuel cell separator 2 after warp correction. The same numbers are assigned to the same components as in example 1, and the explanations are omitted. Furthermore, the first bent parts 31 are shown in dotted lines in FIG. 5(B).

The fuel cell separator 5 before correction is cut off at four corners of a rectangular metallic flat plate, and a flat part 18 of the periphery is approximately cross-shaped. And, on the inward of the notches, arc-shaped parts 19 of an arc shape are provided. In the center part region 24, a plurality of projections 25 comprising gas flow channels are arranged in a matrix shape and placed so that the four corners draw curved lines (refer to FIG. 5(A)). In the case such as this, residual stress is prone to emerge on the projections 25 impartially either to row direction or to column direction. Therefore, on the fuel cell separator 5 before correction, a warp curving to two directions occurs on the center part region 24.

In the fuel cell separator 2 with a small warp, the first bent parts 31 are provided on both edge parts 11 of each of flat parts 15, 16 in two directions of the projections 25. The second bent parts 41 are provided on each of the flat parts 15, 16, in the inward from the first bent parts 31, and also closer to the both edge parts 11 than the arc-shaped parts 19. With this, tensile force can be applied outward to two directions onto the center part region 24. Therefore, by eliminating the residual stress acting on the projections 25 to either row direction or column direction, a warp is corrected. Moreover, with the arc-shaped parts 19 provided, the stress does not concentrate to corner portions of the notches while a warp is corrected, thereby the metallic flat plate is not susceptible to break at the corners.

Example 3

Figure 6A:
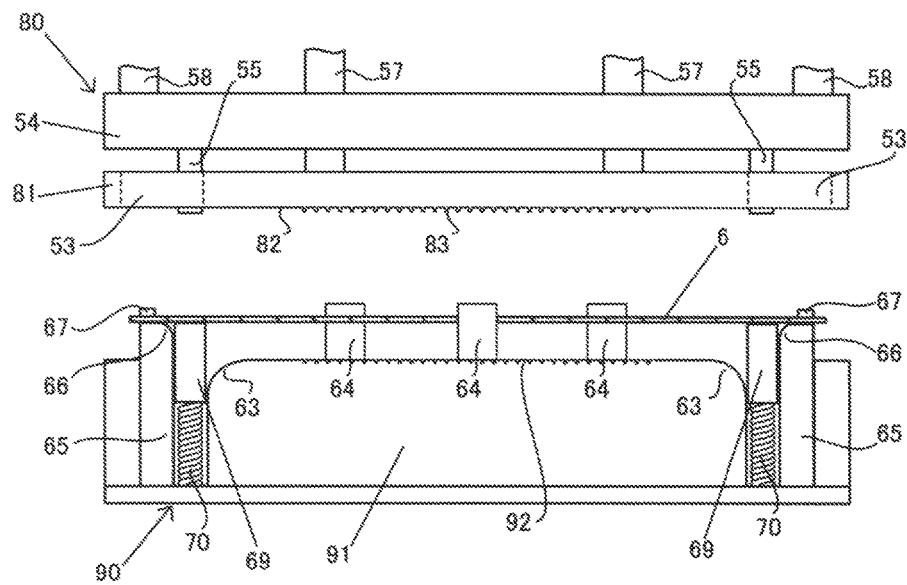
FIGS. 6(A) and 6(B) are a process drawing in the case warp correction and convex forming are done in one step (Example 3)
Figure 6B:
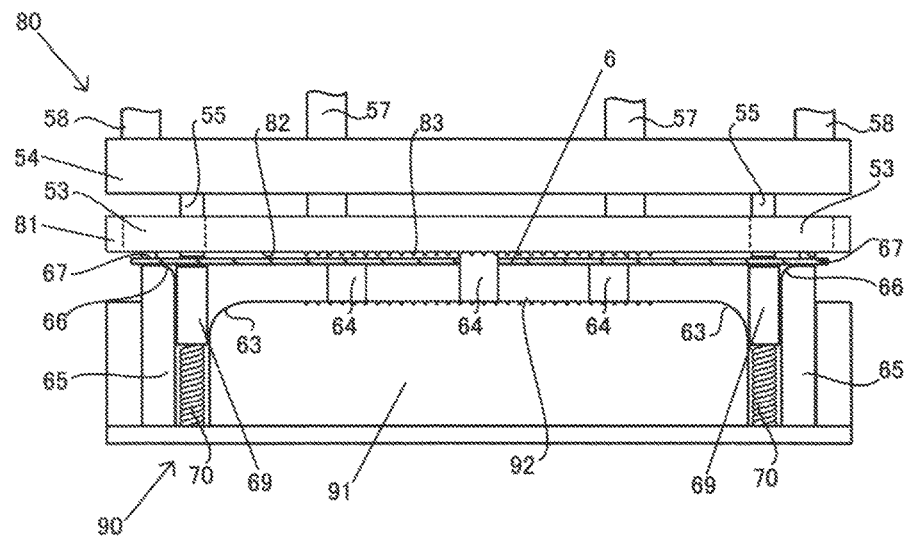
Figure 7C:
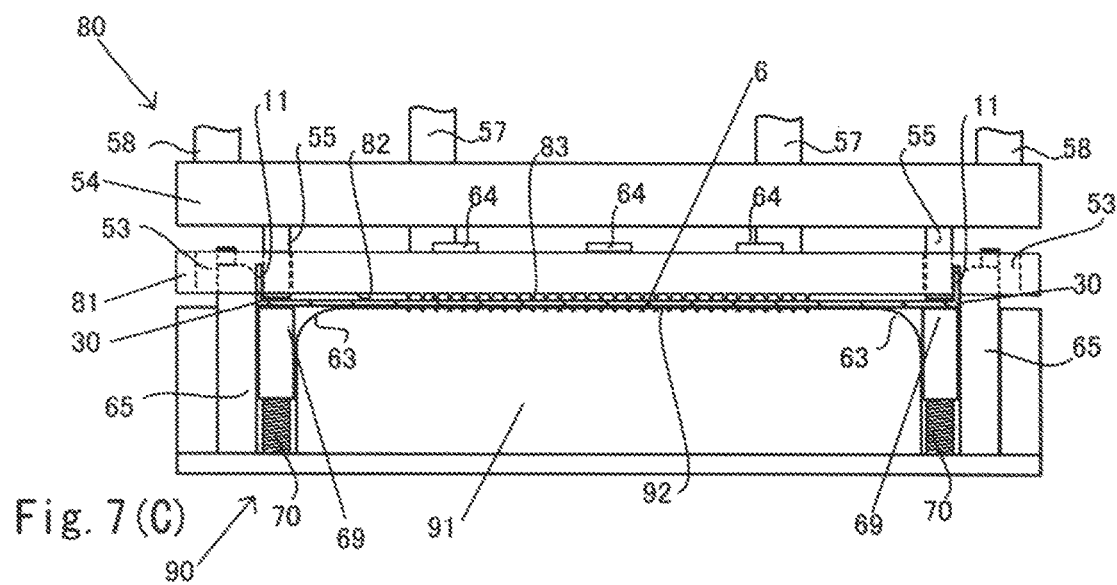
FIGS. 7(C), 7(D), and 7(E) are a process drawing in the case warp correction and convex forming are done in one step (Example 3)
Figure 7D:
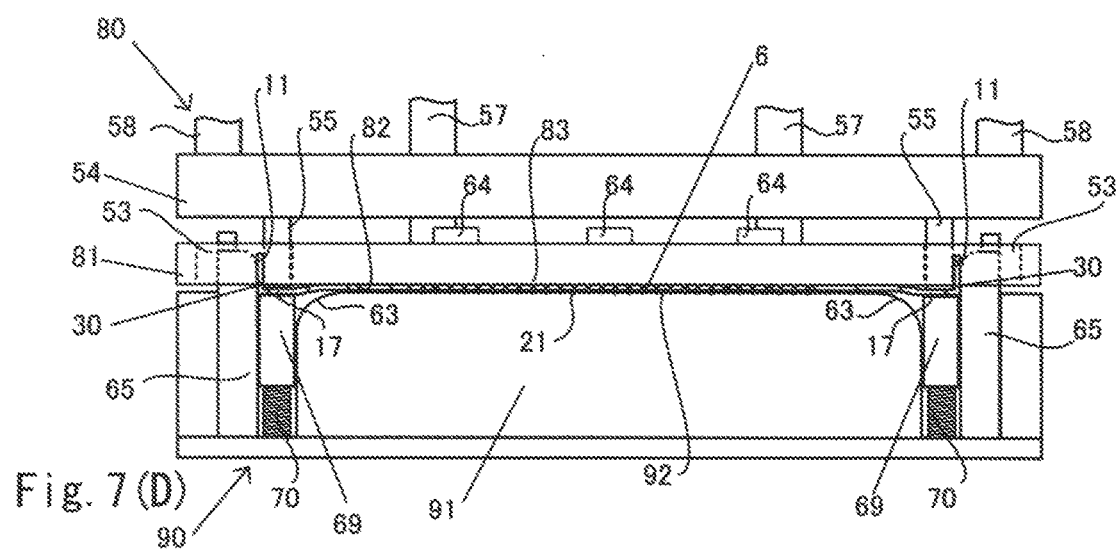
Figure 7E:
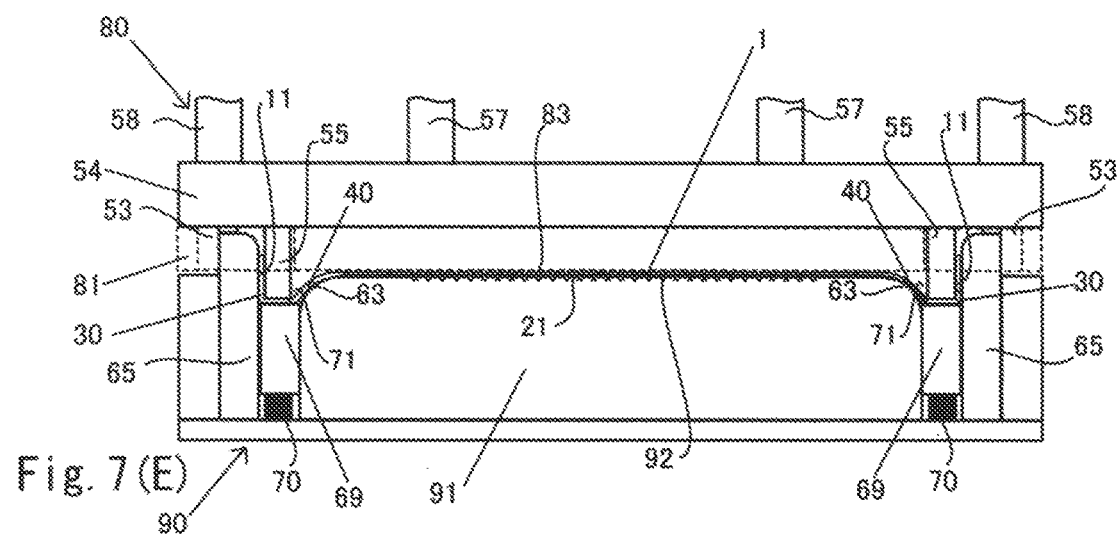

In example 3, referring to FIGS. 6(A) and 6(B) and FIGS. 7(C), 7(D), and 7(E), the production method in the case to produce the fuel cell separator 1 with a small warp through one sequential step will be explained. FIG. 6(A) shows the state before a start of a warp correction step, and FIG. 6(B) shows the step to pinch a smooth metallic flat plate 6, which is before gas flow channel formation and flat, between upper dies 80 and lower dies 90. FIG. 7(C) shows the location-fixing step by bending both edge parts 11 of the metallic flat plate 6, FIG. 7(D) shows the press-forming step of the convex part 21 comprising the gas flow channels, and FIG. 7(E) shows the warp correction step by elongating the metallic flat plate 6. In example 3, the same numbers are assigned to the common components as in example 1, and the explanations are omitted. Furthermore, in order to make understanding easier, the prior die 81 is shown in dotted lines only in FIG. 7(E).

Firstly, referring to FIG. 6(A), the differences from the press dies in example 1 are explained. The differences from the components in example 1 are (FIG. 6(A)), the lower end surface 82 of the prior die 81 is fitted with linear convex parts 83 to form the convex parts 21 (refer to FIG. 7(D)), and the upper surface of the receiving mount 91 is fitted with linear concave parts 92 as opposed to the liner convex parts 83. Firstly, the smooth flat metallic plate 6 is mounted on the erected parts 65 and the receiving parts 69. Next, the metallic flat plate 6 is pinched between the penetrating parts 55 and the receiving parts 69 similarly as in example 1 (FIG. 6(B)). Then, the both edge parts 11 of the metallic flat plate 6 are bent, pinched between the penetrating parts 55 and the erected parts 65, and location-fixed (FIG. 7(C)).

From this state, by further extending the extension rods 57, the metallic flat plate 6 is pressurized while pinched between the prior die 81 and the receiving mount 91, and the convex parts 21 are press-formed (FIG. 7(D)). And, the flat parts 17 in the vicinity of the bent lines configured by the first bent parts 30 start to be slightly curved. And, similarly as in example 1, the second bent parts 40 are formed, and the metallic flat plate 6 is elongated, thereby a warp of the metallic flat plate 6 is corrected (FIG. 7(E)). With this, the beneficial effect is realized in that the fuel cell separator 1 with a small warp (refer to FIG. 1(A)) is produced in one step.

Example 4

Figure 8:
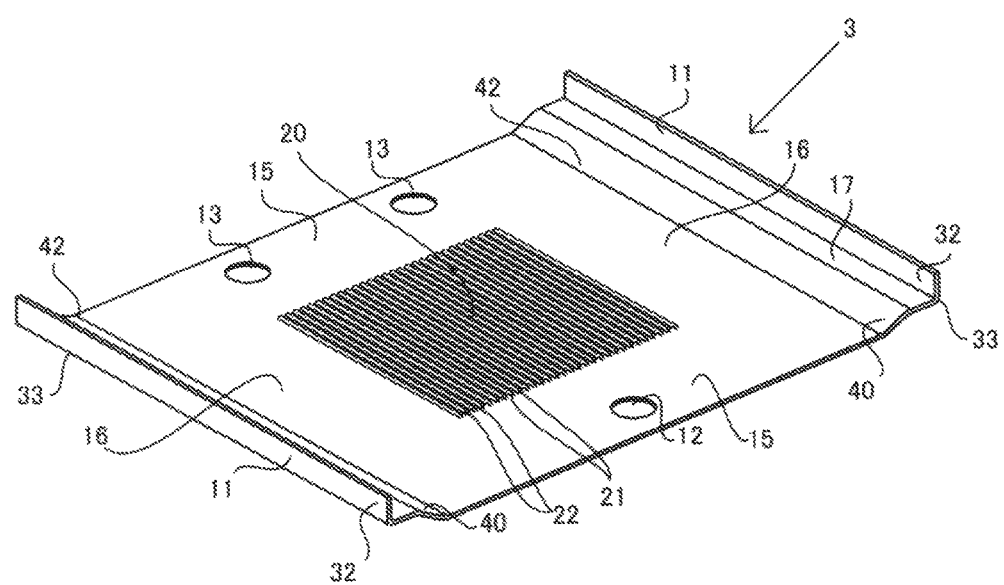
FIG. 8 is a perspective view of a fuel cell separator (Example 4)

In example 4, referring to FIG. 8 and FIGS. 9(A), 9(C), and 9(D), a fuel cell separator 3 with a small warp and the steps to correct a warp by relatively moving the center part region of the fuel cell separator downward against the bent edge parts are explained. FIG. 8 shows a perspective view of the fuel cell separator 3. FIG. 9(A) shows the state before a start of a warp correction step, FIG. 9(C) shows the location-fixing step by bending both edge parts 11 of the fuel cell separator 2 before correction, and FIG. 9(D) shows the step to correct a warp of the fuel cell separator 2 by pushing down the center part region 20 of the fuel cell separator and the flat part 16 in the vicinity of the center part region in one-piece unit. In example 4, drawings and explanations are partly omitted for common steps with example 1. The step to pinch and hold the fuel cell separator 2 between the upper die 100 and the lower die 101 is omitted because of the similarity to the step to pinch and hold the fuel cell separator 4 between the upper die 50 and the lower die 60 in FIG. 3(B).

The fuel cell separator 3 with a small warp is the same as the fuel cell separator 1 in a configuration except for a point in that the bending direction of the first bent part 32 is being bent upward, to the opposite direction. Next, referring to FIG. 9(A), the differences from each die of example 1 will be explained.

In upper dies 100, structure of a prior die 101, extension rods 107, and moving rods 108 are different from example 1. The prior die 101 is flat on the lower end surface 102, and the surface of shoulder parts 103, 103 of both sides is gently curved. Also, the width thereof is the same as a receiving mount 111 so that only the region in the inward from the second bent parts 40 is pushed down. The extension rods 107 are common as in example 1 except for a point in that the fitted location is different. The moving rods 108 enable only the prior die 101 to advance or retreat in the state that the posterior die 54 is location-fixed.

Lower dies 110 are different from example 1 in the points in that the receiving mount 111, elastic parts 112, and sandwiching parts 113 in place of the receiving parts are provided. The receiving mount 111 is able to advance and retreat vertically by the elastic parts 112, and pushed downward when the elastic parts 112 are compressed in association with the advance of the prior die 101. The sandwiching parts 113 are unmovable fixed linear parts, and the height is the same as the upper surface of the receiving mount in the state that the upper surface is not pushed down.

Next, referring to FIGS. 9(A), 9(C), and 9(D), the production steps are explained. Firstly, the fuel cell separator 2 before correction is mounted on a pair of the erected parts 65 (FIG. 9(A)). Then, the penetrating parts 55 fitted on the prior die 101 come in to contact with the both edge parts 11 of the fuel cell separator 2, the both edge parts 11 are bent approximately vertically, and the first bent parts 32 are formed (FIG. 9(C)). In this state, the fuel cell separator 2 is not to be drawn to the inward side, since the both edge parts are pinched between the penetrating parts 55 and the erected parts 65. Also, the flat parts 17 in the vicinity of the bent lines configured by the first bent parts 32 are pinched and held by the lower end surface of the penetrating parts 55 and the upper end surface of the sandwiching parts 113 (refer to FIG. 3(B)).

And, as the moving rods 108 move and the prior die 101 further advances, the upper surface of the receiving mount 111 is pushed down through the flat part 16 in the vicinity of the center part region of the fuel cell separator 2 (FIG. 9(D)). Then, the fuel cell separator 2 is bent smoothly so as to trace an arc shape along the shoulder parts 103 of the prior die 101, and the second bent parts 40 are formed. With this, a warp of the fuel cell separator 2 is corrected, and the fuel cell separator 3 in a flat state is gained.

(Others)

In the foregoing examples, although the examples, in which the relative moving distance between the gas flow channel-side flat parts and the edge-side flat parts is small and the second bent parts are gently inclined, are described, the relative moving distance is not restricted as far as the bent ends maintain a shape that is along a gentle arc shape. For example, it is needless to say that the relative moving distance may be large and the shape of the second bent parts may be a step shape.

The embodiments disclosed here are illustrative examples in all respects, and it should be considered that the embodiments are not restrictive. The technical scope of the present invention is shown by claims without being restricted to the above explanation, and all modifications are intended to be included in the same meaning and range as the claims.

REFERENCE SIGNS LIST 1, 2, 3, 4, 5, 7 . . . fuel cell separator,
6 . . . metallic flat plate,
10 . . . flat part,
11 . . . both edge parts,
12, 13 . . . piercing hole,
14 . . . a warp,
15 . . . flat part on the side of center part region,
16 . . . flat part in the vicinity of center part region,
17 . . . flat part in the vicinity of bent lines,
18 . . . flat part of the periphery,
19 . . . arc-shaped part,
20, 24 . . . center part region,
21 . . . convex part,
22 . . . gas flow channel,
23 . . . concave part,
25 . . . projection,
30, 31, 32 . . . first bent part,
33 . . . bent line,
40, 41 . . . second bent part,
42 . . . bent end,
50, 80, 100 . . . upper die,
51, 81, 101 . . . prior die,
52, 82, 102 . . . lower end surface,
53 . . . through hole,
54 . . . posterior die,
55 . . . penetrating part,
56 . . . side surface,
57, 107 . . . extension rod,
58, 108 . . . moving rod,
60 . . . lower die,
61 . . . receiving mount,
62 . . . sunken part,
63, 66, 103 . . . shoulder part,
64 . . . locating part,
65 . . . erected part,
66 . . . shoulder part,
67 . . . guide piece,
68 . . . side surface,
69 . . . receiving part,
70, 112 . . . elastic part,
71 . . . hollow groove,
83 . . . linear convex part,
90, 110 . . . lower die,
91, 111 . . . receiving mount,
92 . . . linear concave part,
113 . . . sandwiching part

The invention claimed is:

1. A method for producing a fuel cell separator composed of a metallic flat plate and comprising gas flow channels composed of a plurality of concavoconvex parts in the center region and flat parts on the periphery of the gas flow channels, the method comprises:
a gas flow channel formation step to form the gas flow channels;
an other step, which bends approximately vertically to the same direction and fixes each of both edge parts at least in one direction on the flat parts;
an additional step, which, on each of the flat parts between bent lines of the both edge parts bent in the other step and the center region, bends in parallel to the bent lines by relatively moving flat parts in the vicinity of the center region and flat parts in the vicinity of the bent lines to the vertical direction against the metallic flat plate; and
the additional step is carried out after the gas flow formation step, and while the flat parts in the vicinity of the bent lines are inhibited to be drawn to the center region in the additional step, tensile force is applied to the flat parts in the vicinity of the center region, thereby a warp on the metallic flat plate is suppressed.

2. The method for producing a fuel cell separator according to claim 1, wherein the other step and the additional step are subsequent to the gas flow channel formation step.

3. The method for producing a fuel cell separator according to claim 1, wherein the gas flow channel formation step is carried out between the other step and the additional step.

4. The method for producing a fuel cell separator according to claim 1, wherein, after the other step, the gas flow channel formation step and the additional step are simultaneously carried out.

5. A fuel cell separator with a warp composed of a metallic flat plate and comprising gas flow channels composed of a plurality of concavoconvex parts in the center region and flat parts in the periphery of the gas channels, wherein
first bent parts bending approximately vertically to the same direction respectively on both edge parts at least in one direction of the flat parts are provided,
second bent parts are also provided between the gas flow channels and each of the bent lines configured by the first bent parts,
a sectional shape of the gas flow channel-side bending ends in each of the second bent parts is smoothly curved, and in the flat parts in the inward of each of the bent ends, by elongating to the orthogonal direction to the bent lines, the thickness of the flat parts located on the both sides of the gas flow channels is made thinner than the thickness of the first bent parts, and residual stress is reduced.

6. The fuel cell separator according to claim 5, wherein the plate thickness of the metallic flat plate is defined as 0.5 mm or more and 1.0 mm or less.

7. The fuel cell separator according to claim 6, wherein the concavoconvex parts include a plurality of linear ribs extending long in one direction.

8. The fuel cell separator according to claim 7, wherein the metallic flat plate is cut off at four corners, the inward of notch shape of the notch part on each of the four corners is arc-shaped, and the second bent parts are located closer to the edge parts than the notch parts.

9. The fuel cell separator according to claim 6, wherein the concavoconvex parts are a plurality of independent dot-shaped concavoconvex parts.

10. The fuel cell separator according to claim 9, wherein the metallic flat plate is cut off at four corners, the inward of notch shape of the notch part on each of the four corners is arc-shaped, and the second bent parts are located closer to the edge parts than the notch parts.

11. The fuel cell separator according to claim 6, wherein the metallic flat plate is cut off at four corners, the inward of notch shape of the notch part on each of the four corners is arc-shaped, and the second bent parts are located closer to the edge parts than the notch parts.

12. The fuel cell separator according to claim 5, wherein the concavoconvex parts include a plurality of linear ribs extending long in one direction.

13. The fuel cell separator according to claim 12, wherein the metallic flat plate is cut off at four corners, the inward of notch shape of the notch part on each of the four corners is arc-shaped, and the second bent parts are located closer to the edge parts than the notch parts.

14. The fuel cell separator according to claim 5, wherein the concavoconvex parts are a plurality of independent dot-shaped concavoconvex parts.

15. The fuel cell separator according to claim 14, wherein the metallic flat plate is cut off at four corners, the inward of notch shape of the notch part on each of the four corners is arc-shaped, and the second bent parts are located closer to the edge parts than the notch parts.

16. The fuel cell separator according to claim 5, wherein the metallic flat plate is cut off at four corners, the inward of notch shape of the notch part on each of the four corners is arc-shaped, and the second bent parts are located closer to the edge parts than the notch parts.

* * * * *